(12) United States Patent
Blondel et al.

(10) Patent No.: US 12,400,180 B2
(45) Date of Patent: Aug. 26, 2025

(54) AUTOMATIC INVENTORY OF A WAREHOUSE

(71) Applicant: Schneider Electric Industries SAS, Rueil Malmaison (FR)

(72) Inventors: Charles Blondel, Cras (FR); Yannick Bodin, Lachapelle d'Armentières (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 118 days.

(21) Appl. No.: 17/530,624

(22) Filed: Nov. 19, 2021

(65) Prior Publication Data

US 2022/0172155 A1 Jun. 2, 2022

(30) Foreign Application Priority Data

Dec. 1, 2020 (EP) .................................... 20306469

(51) Int. Cl.
*G06Q 10/087* (2023.01)
*B65G 1/137* (2006.01)
(Continued)

(52) U.S. Cl.
CPC ......... *G06Q 10/087* (2013.01); *B65G 1/1371* (2013.01); *B66C 13/46* (2013.01); *B66C 13/48* (2013.01)

(58) Field of Classification Search
CPC .. G06Q 10/087; G06Q 10/08; G06Q 10/0875; G06Q 20/3278; G06Q 20/3274;
(Continued)

(56) References Cited

U.S. PATENT DOCUMENTS

| 4,796,209 A | 1/1989 | Burk |
|---|---|---|
| 2007/0007354 A1 | 1/2007 | Mueller et al. |

(Continued)

FOREIGN PATENT DOCUMENTS

| CN | 105205629 B | 5/2019 | |
|---|---|---|---|
| WO | WO-2020215901 A1 * | 10/2020 | ......... G01C 21/3415 |
| WO | WO-2021216830 A1 * | 10/2021 | ........... G05D 1/0214 |

OTHER PUBLICATIONS

European Search Report and Search Opinion dated May 14, 2021 for corresponding European Patent Application No. 20306469.6, 6 pages.

*Primary Examiner* — Avia Salman
(74) *Attorney, Agent, or Firm* — Troutman Pepper Locke LLP

(57) ABSTRACT

A system and method for updating an inventory of objects located in a hoisting area wherein a load is handled by a hoisting appliance equipped with a scanning device and spanning a hoisting area, a control device:
- generates a trajectory of the hoisting appliance for navigating through the hoisting area taking in account a time interval and log data,
- wherein the trajectory comprises a starting point, a target point and a number of consecutive line segments connecting the starting point and the target point,
- optimizes the trajectory for allowing a scan of objects associated with old log data during the time interval,
- executes the optimized trajectory and scanning objects during the optimized trajectory, yielding to scan data related to the scanned objects, and
- sends the scan data to a supervisory system for updating the inventory with the scan data.

19 Claims, 6 Drawing Sheets

(51) Int. Cl.
   *B66C 13/46*   (2006.01)
   *B66C 13/48*   (2006.01)
(58) Field of Classification Search
   CPC .. G06Q 30/06; G06Q 30/0635; G06Q 10/047;
   G06Q 10/063; G06Q 10/06395; G06Q
   10/06398; G06Q 10/0832; G06Q
   10/0833; G06Q 10/08355; G06Q 10/10;
   G06Q 30/016; G05B 19/042; G05B
   2219/50391; G05B 2219/39468; G05B
   2219/39473; G05B 2219/39536; G05B
   2219/39543; G05B 2219/39546; G06F
   7/00; G06F 19/323; G06F 2212/178;
   B65G 1/1371; B65G 1/0492; B65G 1/10;
   B65G 1/1378; B66C 13/46; B66C 13/48;
   B66C 17/00; B66C 17/14; B66C 17/16;
   B66C 17/18; B66C 17/20; B66C 17/22;
   B66C 17/24; B66C 17/26; B66C 19/00;
   B66C 21/00; B66C 23/00; G03G
   21/1657; G07G 1/0045; G07G 1/009;
   G09F 3/0335; G16H 10/65; H01H
   2300/032; H04M 2250/04; H04Q 1/138;
   H04Q 2209/47; H04W 4/008; H04W
   4/80; G05D 1/0246; G05D 1/0223; G05D
   1/0236; G05D 1/0276; G05D 1/101;
   G06K 7/10; G06K 7/10009; G06K
   7/10722; B64C 39/024; G06T 7/73
   USPC .......................................................... 705/28
   See application file for complete search history.

(56)            References Cited

U.S. PATENT DOCUMENTS

2014/0361077 A1\*  12/2014  Davidson ............ G06Q 10/087
                                                      235/385
   2020/0286032 A1\*   9/2020  Bogolea ............... H04N 23/698
   2021/0284446 A1\*   9/2021  Cairl .................... G05D 1/0044

\* cited by examiner

AUTOMATIC INVENTORY OF A WAREHOUSE

FIELD OF INVENTION

The present invention generally relates to a method for an automatic inventory of a warehouse wherein a hoisting appliance is spanning the warehouse, the hoisting appliance being arranged for carrying a load suspended by cables from a trolley that can move with the hoisting appliance.

BACKGROUND

Hoisting appliances 1 such as bridge cranes, gantry cranes or overhead travelling cranes usually comprise a trolley 2 which can move over a single girder or a set of rails 3 along a horizontal axis X, as shown in FIG. 1. This first movement along the X-axis is generally referred to as short travel movement and/or trolley movement. Depending on the type of appliance, the girder or the set of rails 3, also referred to as bridge, may also be movable along a horizontal axis Y perpendicular to the X-axis, thus enabling the trolley to be moved along both the X- and Y-axes. This second movement along the Y-axis is generally referred to as long travel movement and/or bridge or crane movement. The amount of available short travel along the X-axis and long travel along the Y-axis determines a hoisting area that is spanned by the hoist 1.

A load suspension device 4 is associated with a pulley or cables which pass through the trolley 2, the length of the cables or pulley 5 being controlled by the trolley 2 to vary, thereby enabling displacement of a load 6 along a vertical axis Z, referred to as hoisting movement.

Transferring a suspended load across a warehouse, a hall, shipyard, metallurgic or nuclear plant, requires an operator to be very careful to prevent people, obstacles or objects that are present within the hoisting area from being hit or damaged in any way. Hence, in addition to size, swinging of the suspended load, commonly referred to as sway, is something that the operator needs to take in account when manoeuvring the load across the working place along a trajectory within the boundaries of the hoisting area.

This complexity is what has hampered development of fully automated hoisting systems being capable of transferring suspended loads independently along a trajectory. Moreover, these systems are developed to manage the arrangement of products in the warehouse in order to optimize the output stream of products from the warehouse. This management is based on decisions depending on the production orders as inputs, the customer orders as output, the stock of products and the environment.

This management may suffer from a discordance in stock inventory that will drive to useless crane movements. In a metal industry where some products may be hot and may need to time to cool down, this management may suffer also from a wrong temperature calculation of a product to be manipulated.

A missing or different product as expected in the warehouse, or eventually a temperature measurement, will conduct to a reject feedback from the crane to a warehouse management system. Thus new orders for the crane need to be performed and a human visit in the warehouse needs to be planned.

Accordingly, there is a need for developing cranes that can keep updated regularly the inventory of objects in a warehouse in an efficient way.

SUMMARY

This summary is provided to introduce concepts related to the present inventive subject matter. This summary is not intended to identify essential features of the claimed subject matter nor is it intended for use in determining or limiting the scope of the claimed subject matter.

In one implementation, there is provided a method for updating an inventory of objects located in a hoisting area wherein a load is handled by a hoisting appliance equipped with a scanning device and spanning a hoisting area, the inventory comprising physical data and log data associated with objects and being provided by a supervisory system supervising the hoisting area, the method comprising in a control device:

generating a trajectory of the hoisting appliance for navigating through the hoisting area taking in account a time interval and the log data, wherein the trajectory comprises a starting point, a target point and a number of consecutive line segments connecting the starting point and the target point, optimizing the trajectory for allowing a scan of objects associated with old log data during the time interval, executing the optimized trajectory and scanning objects during the optimized trajectory, yielding to scan data related to the scanned objects, sending the scan data to the supervisory system for updating the inventory with the scan data.

Advantageously, the inventory is updated during the operation time of the hoisting appliance while respecting the global workload of the hoisting appliance. The generated and optimized trajectory is thereby adapted to favor the scan of objects of interest for minimizing discordance in the inventory and optimizing the output stream in the hoisting area.

In an embodiment, the trajectory is generated taking in account a 3-dimensional model of the hoisting area, the model comprising located obstacles within the hoisting area.

Advantageously, it takes into account the presence of people and obstacles while maintaining safety and timing conditions.

In an embodiment, when the load is handled by the hoisting appliance, the load is transported by the hoisting appliance from the starting point to the target point or the load is picked up at the target point by the hoisting appliance navigating from the starting point.

In an embodiment, the scan data contain physical data and log data associated with objects.

In an embodiment, the physical data associated with an object contain measure values of position, dimension and temperature of said object and the log data associated with said object contain a timestamp of the measure.

In an embodiment, the optimization of the trajectory depends on a value of temperature of at least one object.

In an embodiment, the trajectory is generated taking in account a 3-dimensional model of the hoisting area, the model comprising located obstacles within the hoisting area.

In an embodiment, the generated trajectory is initially based on the shortest or fastest path from all possible paths.

In an embodiment, the trajectory is optimized by adding and removing line segments.

In an embodiment, the optimization of the trajectory depends on one or more zones in the hoisting area wherein many objects are associated with old log data.

In an embodiment, the time interval is determined based on a workload of the hoisting appliance.

In another implementation, there is provided an apparatus for updating an inventory of objects located in a hoisting area wherein a load is handled by a hoisting appliance equipped with a scanning device and spanning a hoisting area, the inventory comprising physical data and log data associated with objects and being provided by a supervisory system supervising the hoisting area, the apparatus comprising:

one or more network interfaces to communicate with a telecommunication network;
a processor coupled to the network interfaces and configured to execute one or more processes; and
a memory configured to store a process executable by the processor, the process when executed operable to:
generate a trajectory of the hoisting appliance for navigating through the hoisting area taking in account a time interval and the log data,
wherein the trajectory comprises a starting point, a target point and a number of consecutive line segments connecting the starting point and the target point,
optimize the trajectory for allowing a scan of objects associated with old log data during the time interval,
execute the optimized trajectory and scanning objects during the optimized trajectory, yielding to scan data related to the scanned objects, In another implementation there is provided a computer-readable medium having embodied thereon a computer program for executing a method for updating an inventory of objects located in a hoisting area wherein a load is handled by a hoisting appliance equipped with a scanning device and spanning a hoisting area. Said computer program comprises instructions which carry out steps according to the method according to the invention.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

The same reference number represents the same element or the same type of element on all drawings.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
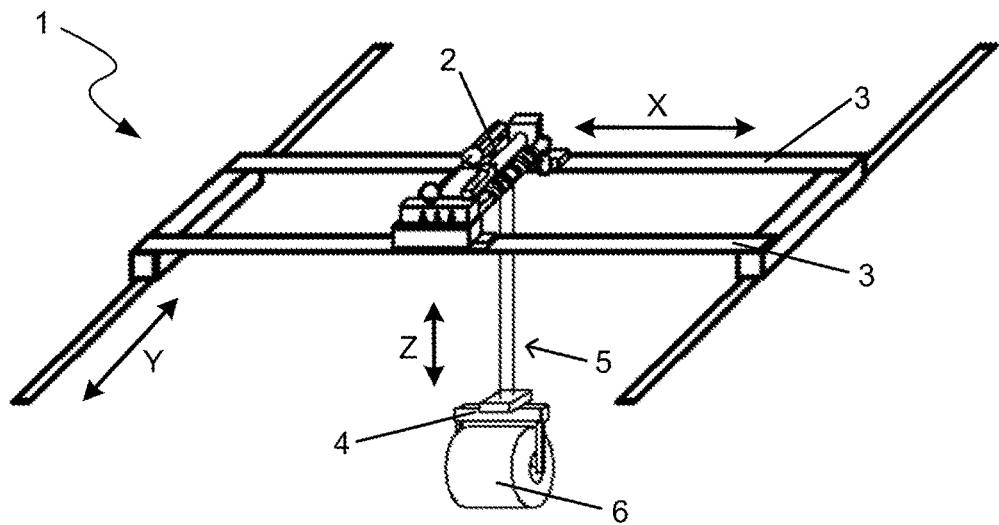
FIG. 1 shows schematically an example of a hoisting appliance.
Figure 2:
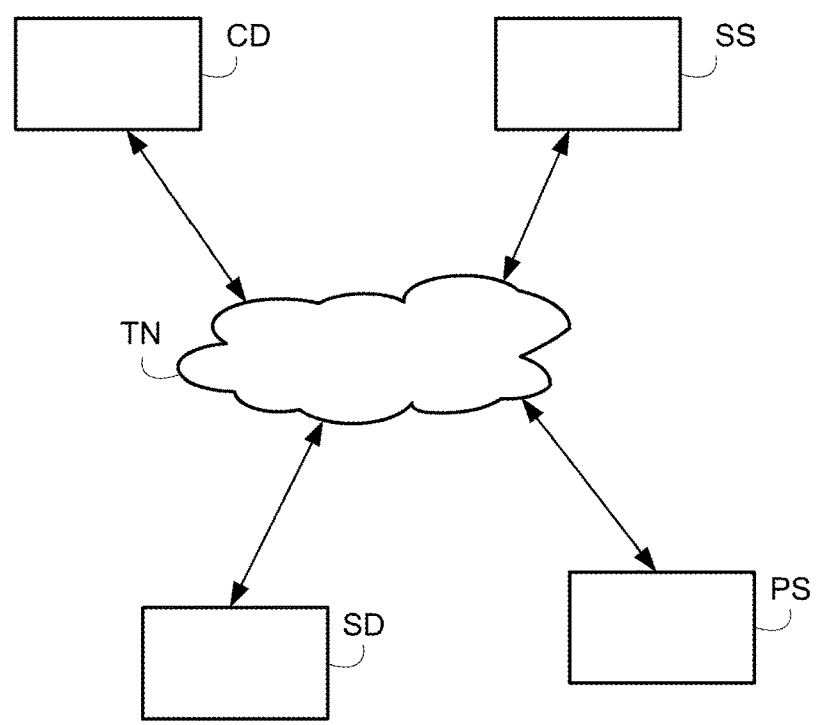
FIG. 2 shows schematically an example of a communication system for updating an inventory of objects located in a hoisting area.

Referring to FIG. 2, a communication system for updating an inventory of objects located in a hoisting area comprises a control device CD, a positioning system PS, a scanning device SD and a supervisory system SS.

A hoisting area, such as a warehouse, a yard, a hall, or other working area, is provided with a supervisory system SS that is an IT control system for supervision of the hoisting area. The supervisory system SS provides information to the control device for trajectory execution, authorization i.e. access management, and security in general. The supervisory system SS stores an inventory of objects located in the hoisting area that needs to be updated in order to optimize the output stream of products from the hoisting area.

The control device CD is able to communicate with the supervisory system SS, with the positioning system PS and the scanning device SD through a telecommunication network TN. The telecommunication network may be a wired or wireless network, or a combination of wired and wireless networks. The telecommunication network can be associated with a packet network, for example, an IP ("Internet Protocol") high-speed network such as the Internet or an intranet, or even a company-specific private network. The control device CD may be Programmable Logic Controllers (PLC) and other automation device able to implement industrial processes and able to communicate with the supervisory system SS for exchanging data such as requests, inputs, control data, etc.

In one embodiment, the positioning system PS, such as a radar system, including a radio emitter and a radio detector, can emit radio waves that will be reflected by structures of the surrounding environment, like a wall of the warehouse, that are to be detected by the detector of the radar. This will allow determining the distance between the trolley and the wall. In order to further increase precision, a second radio detector may be installed at a fixed reference position at a distal end of the rails. This will allow determining the distance between the trolley and the rail reference position. In one embodiment, the positioning system PS is associated with the trolley and can determine the position of the trolley along the axis X and axis Y with respect to the short travel movement and/or trolley movement and with respect to the long travel movement and/or bridge or crane movement.

In one embodiment, the scanning device SD is mounted on the hoisting appliance and is configured to scan objects located in the warehouse and can perform 3D recognition of the objects, by measuring size and position of the objects. The scanning device can be equipped with an infrared camera able to measure the temperature of an object, or the infrared camera is incorporated in a separate sensor.

The scanning device SD may include a light source and two or more light sensors emitting light via the light source that will be reflected by an object present below the trolley. The reflected light may be detected by the light sensors of the scanning device. This will allow determining the distance between the trolley and the object below it.

The scanning device SD performs measures on objects in association with time logs in order to produce a list of objects comprising for example for each object an identifier or an index associated with measures of position (e.g. XYZ coordinates), dimension (e.g. length and diameter) and temperature and with log data. The log data contains a timestamp of the measure (including date and time). For example, at each given time of measure on one object, the control device retrieves measure of Z axis from the scanning device, measures of X and Y axis from the positioning system, measure of temperature from the infrared camera, to produce the list of objects. In another embodiment, the functionalities of the positioning system, the scanning device and the infrared camera can be incorporated in a single entity.

The control device CD is configured to command the hoisting appliance with specific trajectories in order to update efficiently the inventory of objects. The control device CD receives and analyses data coming from the positioning system PS and the supervisory system SS to execute a trajectory for the hoisting appliance. The control device CD receives data from the scanning device SD and forwards them to the supervisory system SS for updating the inventory of objects.

Figure 3:
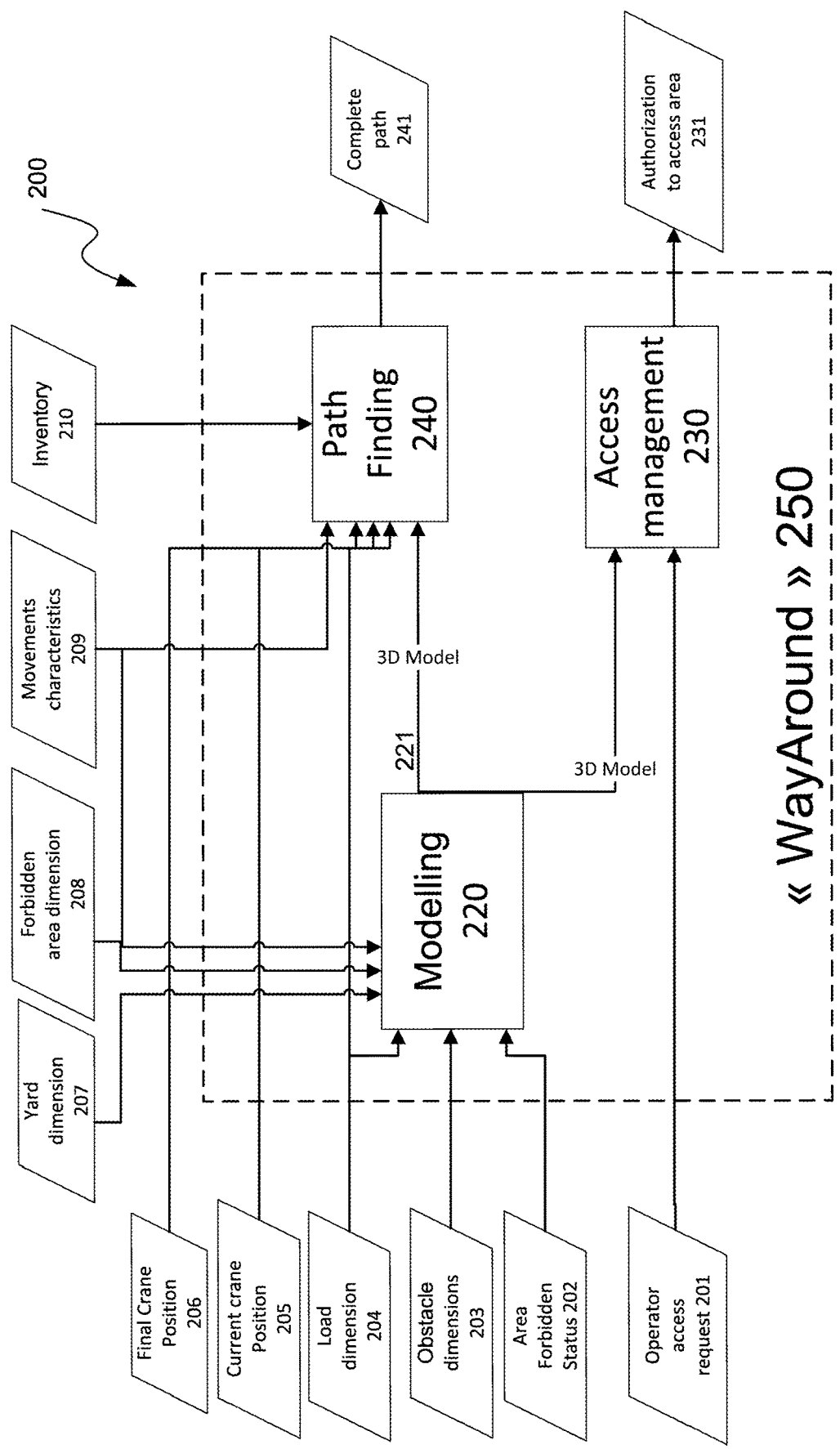
FIG. 3 illustrates an example of a block diagram of a process for creating a path for a hoisting appliance.

Referring to FIG. 3, a block diagram of a general process 200 is shown for creating the path to be followed by the crane for transporting a load from one place within the hoisting area to another. The process may be executed by the control device associated with a hoisting appliance. The "way around" process 250 for creating the path includes three sub-process: a modelling process 220 for maintaining a 3D model of the hoisting area i.e. the yard and obstacles present therein, an access management process 230 for ensuring that authorization for entering and/or passing through areas is managed, and a path finding process 240 for determining the path to be completed by the hoisting appliance.

The modelling process 220 has as inputs dimensions of the yard itself 207, dimension of obstacles within the yard 203, forbidden areas within the yard 208 and the access status 202 thereof, dimensions 204 of the load selected to be transported, and movement characteristics 209 of the load and of obstacles that may be present within the yard. The output of the modelling process 220 is the 3D model 221 of the hoisting area and elements therein, i.e. the forbidden areas, obstacles and load.

The access management process 230 has as input data the 3D model 221 and the operator access requests 201. Considering the current trajectory and the current speed of the crane, the access process 230 will then give the access authorizations 231 or it may refuse authorization.

The path finding process 240 has as input the 3D model 221, the actual or current crane position 205, the desired final crane position 206, the load dimension 204, movement characteristics 209 and the inventory 210 of objects located in the hoisting area. The output of the path finding process 240 is the path 241 that is to be completed by the hoisting appliance.

The inventory 210 of objects include position, dimension, temperature and with log data of objects. The inventory may further include indication of priority zones defined by XYZ coordinates to be scanned.

The yard dimensions 207 include length and width of the hoisting area spanned by the crane and minimum height specifications, whereas a maximum height is basically determined by the height of the crane itself.

The obstacle dimensions 203 include length, width, diameter and/or height for each obstacle present in the hoisting are, such as various containers, crates, goods, equipment etc. The obstacle dimensions 203 may further include the same data for obstacles that are potentially present such as e.g. vehicles and other movable equipment. The load dimensions 204 of the load selected to be transported may be expressed in length, width, diameter, height and/or weight. The movement characteristics 209 of the load and of obstacles may be specified by speed, acceleration, deceleration, maximum sway and/or transport height.

The forbidden areas 208 are areas that have limited or restricted access, and may be specified by length, width and height. These areas may include an operation zone covered by certain equipment, such as conveyor belt, a deployment zone wherein particular equipment is deployed, or an arrival zone where new goods arrive. They may also include walk ways or passage zones where operators and/or other personnel could be walking. The access status 202 of forbidden areas 208 may change over time, when e.g. an equipment is only deployed temporarily or arrival of new goods in the arrival zone only occurs during predetermined time intervals.

The current crane position 205 may be specified as X, Y, Z coordinates within the hoisting area. Likewise, the desired final crane position 206 may be specified similarly.

The output 3D model 221 of the modelling process 220 describes the hoisting area as a spatial model defining free and blocked areas or zones where and/or through which the trolley moved by the crane may travel.

Figure 4:
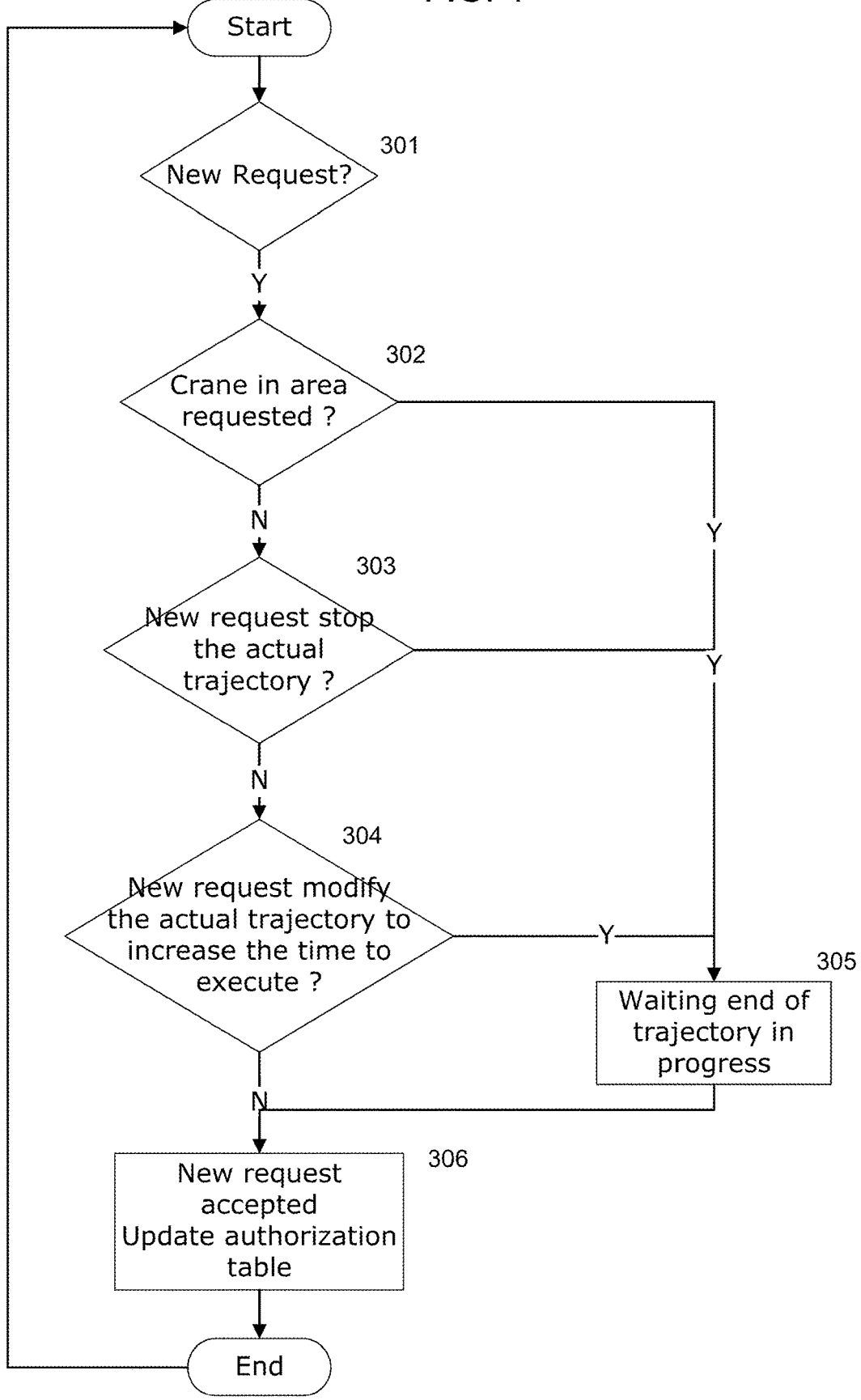
FIG. 4 illustrates an example of a flowchart for access management.

Referring to FIG. 4, an example of a flowchart for the sub-process of access management 230 is shown. Hoisting appliances may be continuously in operation within the hoisting area of for example a shipyard or warehouse, and accordingly may be performing consecutive tasks. Within a shipyard or warehouse some of the areas may be off-limit for various reasons. Hence, management of access to particular areas for performing tasks requested by operators is required.

The process starts with a new access request 301 from an operator for access to a certain area of the industrial yard, while the hoisting appliance, e.g. crane may be transporting a particular load from a start position to a target position. Upon receipt of the new request, it is checked 302 whether the current position of the hoisting equipment is in the area to which the access request is made. If yes, the process waits 305 until the path in progress is finished, after which the new request is accepted 306 and the authorization table is updated. If no, the process continues, and it is checked if the new request would block the current path forcing the crane to stop 303. If yes, stopping is prevented and the process waits 305 until the path in progress is finished. If no, the process continues, and it is checked if the new request would force the crane to modify 304 the current path and would increase the time of execution. If yes, interruption is prevented and the process waits 305 until the path in progress is finished. If the modification due to the interrupting request would not increase execution time, e.g. because an alternative crane path would be available, the new request might be accepted. In addition, a certain tolerance of increased execution time might be applied, which would allow the new request if the increase of execution time of the future path stays within the tolerance threshold. So, if no, the new request is accepted 306 and the authorization table is updated.

The authorization table may be a variable structure that is shared with the supervisory system of the hall or yard. From this information, like current position of the crane and authorization, the supervisory system will be able to monitor the hall or yard in order to authorize personnel to enter an area and to monitor and stop the equipment present in case it would invade this particular area.

Figure 5:
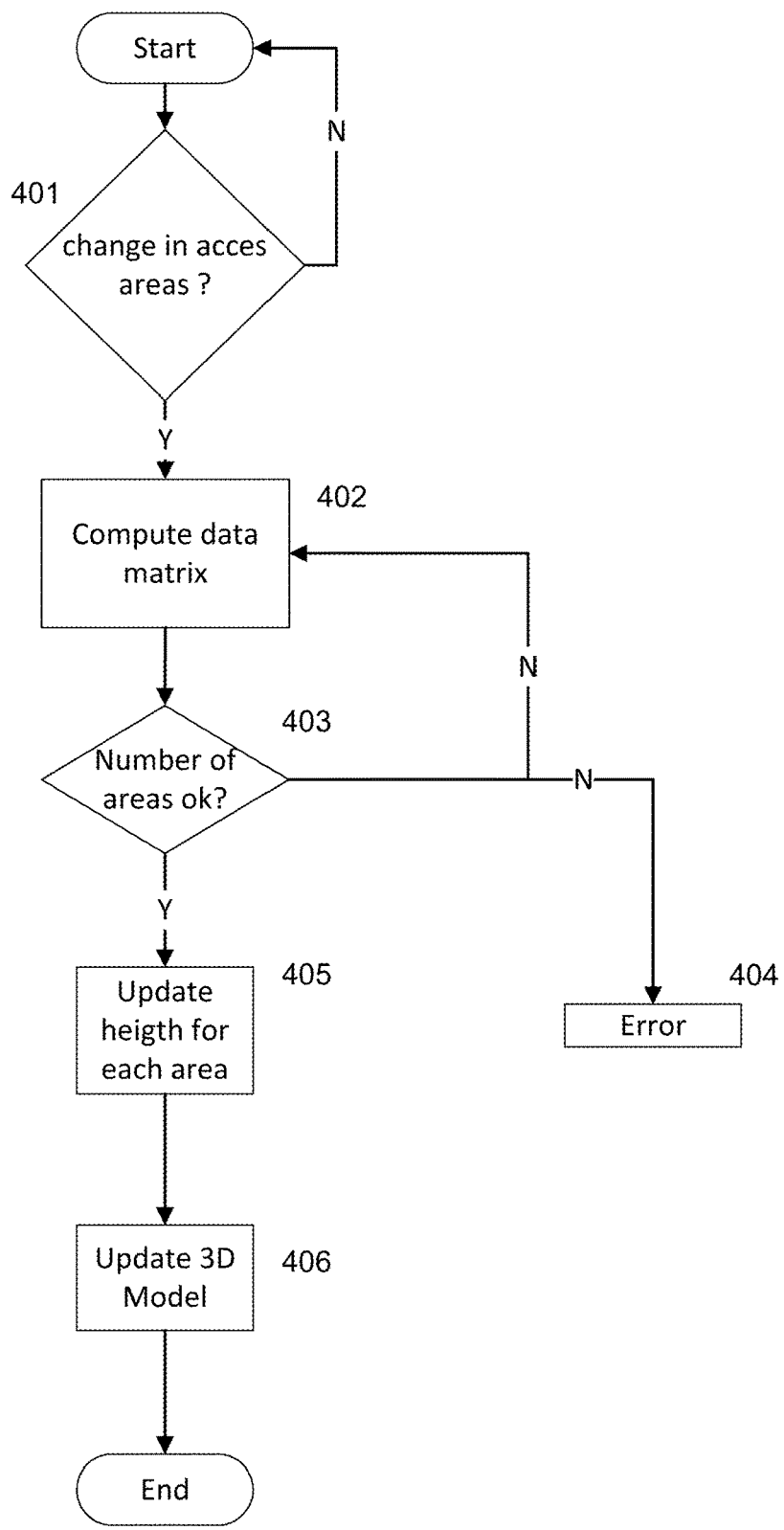
FIG. 5 illustrates an example of a flowchart for maintaining a 3D model of a hoisting area.

Referring to FIG. 5, an example of a flowchart of a process for maintaining a 3D model of a hoisting area is shown. The process may be triggered by a change 401 in the number of access areas, a change in the dimensions of access areas, or in the status change of forbidden access areas. The process then proceeds with computing a data matrix 402, which represents the hoisting area as a 2-dimensional surface wherein various areas are delimited. The areas may represent obstacles, walkways, deployment zones and all other type regions and/zones.

In order to keep the number of different areas manageable, the process may optionally include a check 403 on whether a maximum number is not exceeded. If the maximum is exceeded an error 404 may be notified and the data matrix may be re-computed to aggregate particular areas.

If the number is ok, or if the check 403 is not performed, the process continues with updating 405 the height for each respective area. Once the height for each area is updated, the 3D model is updated with the respective heights; or at least the heights for the areas that are accessible. As if an area is forbidden, off-limit or for other reasons not accessible, the height is irrelevant as the crane may not travel over or through the area.

Figure 6:
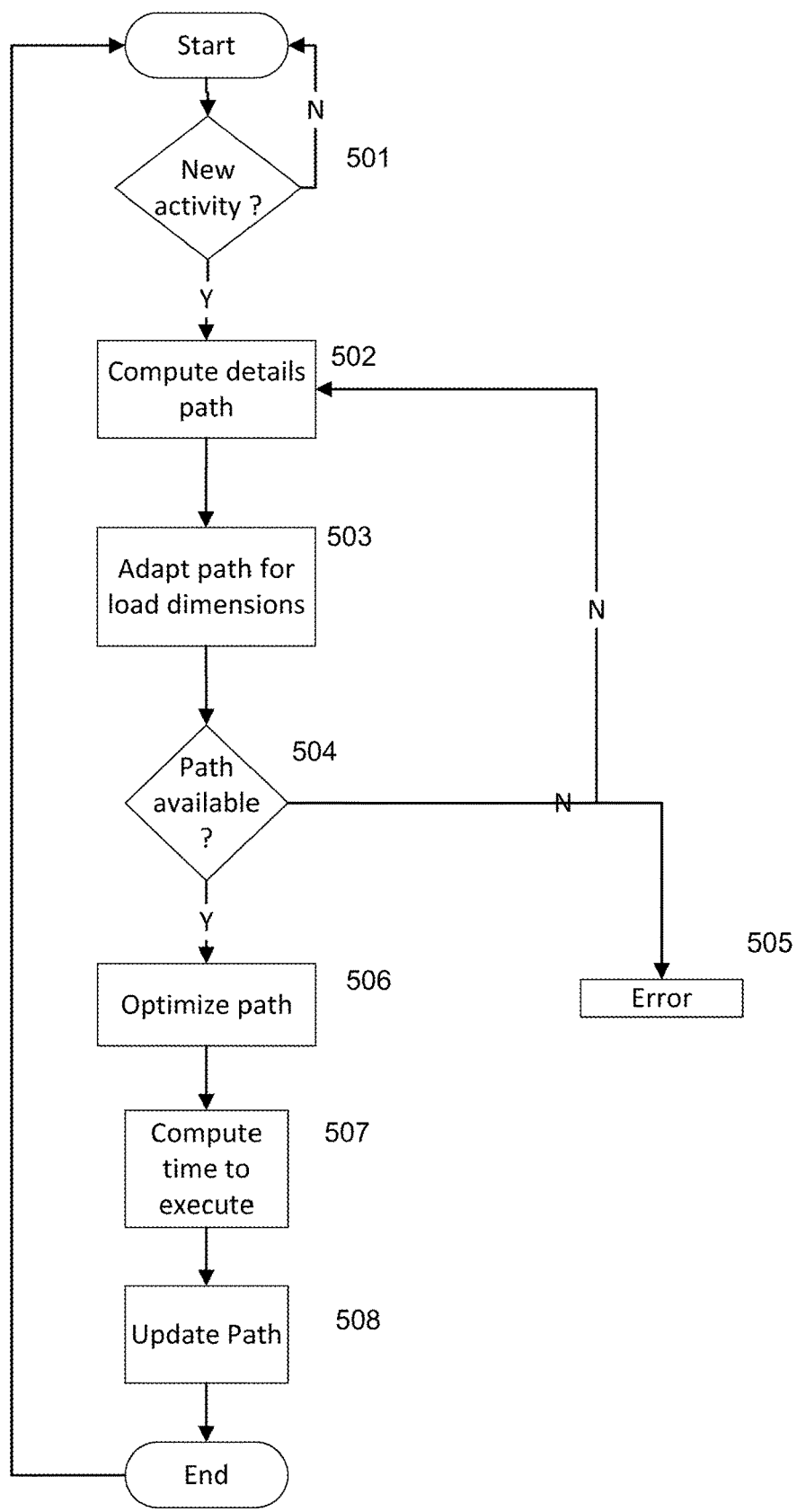
FIG. 6 illustrates an example of a flowchart for finding a path.

Referring to FIG. 6, an example of a flowchart of a process for finding a path is shown. The process is initiated when a new task is requested 501 for handling a load from a starting position to a target position. The handling corresponds to transporting the load or navigating for picking the load. Then an initial path is computed 502 using for example Dijkstra's shortest path first algorithm as known in the art. The initial path is then adapted 503 to take in account the dimensions of the intended load, if the path corresponds to the transport of the load, and the log data of the inventory.

Availability of the path is then checked 504; for example whether the path is not blocked due to e.g. load height, diameter or due to restricted access. If not available an error is notified 505 and a new path may be computed 502. If the initial path is available, the path may be optimized 506 for scanning objects in given zones of the hoisting area in order to update the inventory of objects.

The path as optimized may be used to determine the amount of time 507 required to execute the path. The calculated travel time is made available to the overall supervisory system of the hall to allow planning further activities of the crane in question and of other machinery, including additional cranes, present in the hall. Accordingly, the optimized path is updated 508 with the execution time to allow further coordination with other tasks requested.

Figure 7:
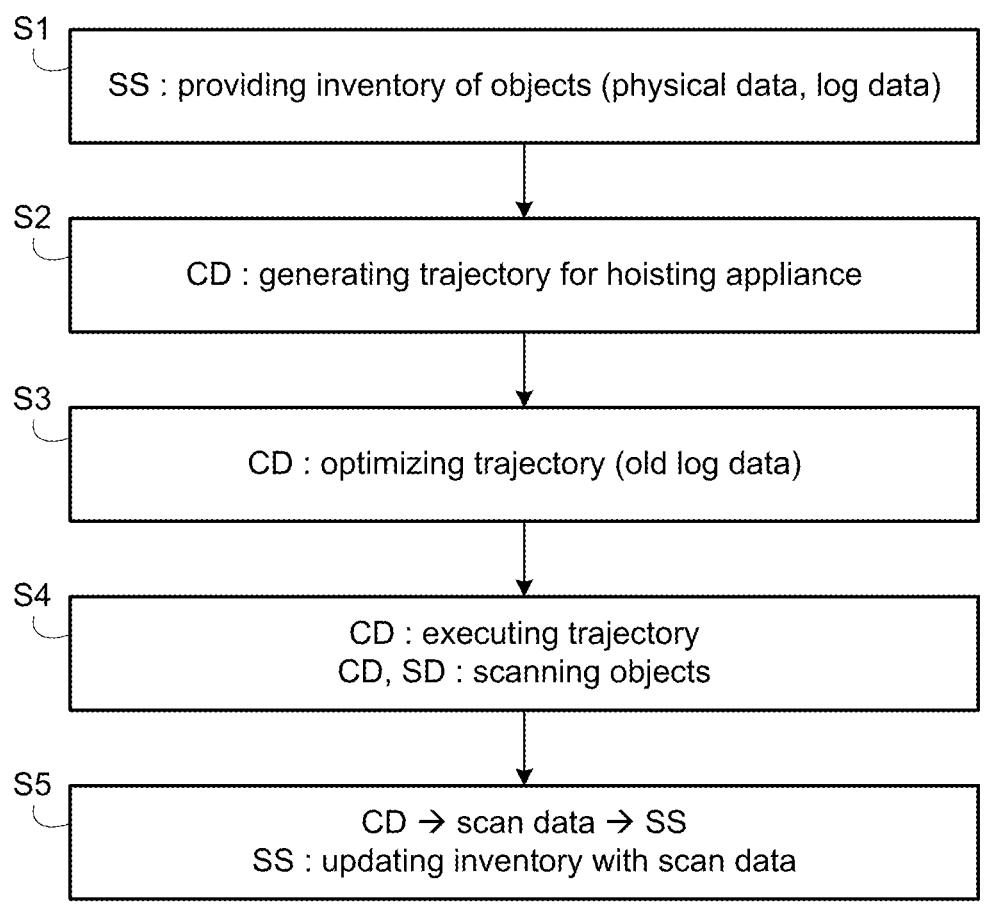
FIG. 7 illustrates an example of a method for updating an inventory of objects located in a hoisting area.

With reference to FIG. 7, a method for updating an inventory of objects located in a hoisting area wherein a load is handled by a hoisting appliance equipped with a scanning device and spanning a hoisting area according to one embodiment of the invention comprises steps S1 to S5.

In step S1, the supervisory system SS provides an inventory of objects located in the hoisting area. In one embodiment, the inventory may be defined by a list of objects comprising for each object an identifier or an index associated with physical data and log data. The physical data contain measure values of position, dimension and temperature. The log data contain a timestamp of the measure. The physical data and log data may have been obtained previously by the scanning device. The identifier of an object may be derived from the physical data, for example from one or more measure values of the position or the dimension.

In step S2, the control device CD generates a trajectory of the hoisting appliance for navigating through the hoisting area taking in account a model of the hoisting area, a time interval and the log data. The trajectory includes a starting point, a target point and a number of consecutive line segments connecting the starting point and the target point. The trajectory may be generated using an algorithm, it may be selected from a pre-determined set of paths, or from other prior stored path data. When using an algorithm, such as Dijkstra's algorithm, the generation of the trajectory may include selecting the shortest path from all possible paths. In general, a Dijkstra's algorithm or any other algorithm will provide multiple possible paths from point A to point B.

The model of the hoisting area may be a 3D model defined by a coordinate system, wherein each block has an X-, Y- and Z-coordinate. Within the 3D model obstacles are located by indicating the XYZ-coordinates that define the space that each obstacle occupies. In addition, the 3D model may include restricted area data relating to one of the obstacles.

The time interval is determined by the control device based on a workload of the hoisting appliance and can be considered as a time window allocated for the purpose of scanning objects. The workload of the hoisting appliance may be provided by the supervisory system that is able to coordinate different tasks in the hoisting area. For example, if it is determined that the workload does not allow extra time for scanning purposes, the trajectory may correspond to the shortest or fastest path from all possible paths from the starting point to the target point. A fastest path may be longer than the shortest path but may allow fastest speed in some segments to reach the target point. If it is determined that the workload allows extra time for scanning purposes, the trajectory may be extended in order to scan other objects according to different priorities.

The log data associated with an object contain a timestamp that corresponds to the last time when the object was scanned. The generation of the trajectory may depend on a priority based on the log data, especially on older log data, in order to update the physical data of objects having the older data associated with objects.

Optionally, if the trajectory corresponds to the transport of a load, the trajectory generation may take in account load parameters, e.g. by the supervisory system, and may include weight and dimensions like length, height, and width of the load. These parameters may be entered by an operator in advance or provided by the scanning device, or coming from an update of the inventory.

In step S3, the control device CD optimizes the trajectory for scanning given objects in order to update the inventory with the physical data of said given objects in an efficient way. It is assumed that when the inventory is updated with the physical data of an object, the inventory is also updated with associated log data.

The trajectory is optimized for allowing a scan of objects associated with old log data during the time interval. The optimization of the trajectory may depend also on a priority based on a maximum number of objects to be scanned during the time interval or on a priority based on the older log data.

The optimization of the trajectory may depend on a balance between a path for scanning a maximum number of objects during the time interval and scanning objects with older log data. This may lead to a trajectory for scanning a maximum number of objects associated with older log data during the time interval.

In one embodiment, the optimization of the trajectory may depend on one or more zones in the hoisting area wherein many objects, for example identified via their associated position, are associated with old log data. The trajectory is thus adjusted to cover at least a part of said one or more zones.

In one embodiment, the optimization of the trajectory may depend on a value of temperature of an object that needs to be checked regularly, for example for determining when said object can be manipulated.

The optimization of the trajectory may be based on the initially generated trajectory, that may correspond to the shortest or fastest path from all possible paths, and may then be adjusted by adding and removing line segments allowing to scan objects according to the priority.

In step S4, the control device CD executes the trajectory and the scanning of objects during the trajectory, yielding to scan data related to the scanned objects. As the control device CD is directly connected to the scanning device SD, the control device can command the scanning device SD to operate and to scan objects and then can receive scan data related to the scanned objects.

In step S5, the control device CD sends the scan data to the supervisory system SS that then updates the inventory with the scan data. More especially, the log data associated with an object are updated and replaced with new log data. Moreover at least some physical data associated with said object may be updated and replaced with new physical data, if said object has been moved or if the temperature of the object has changed (typically has decreased).

An embodiment comprises a control device under the form of an apparatus comprising one or more processor(s), I/O interface(s), and a memory coupled to the processor(s). The processor(s) may be implemented as one or more microprocessors, microcomputers, microcontrollers, digital signal processors, central processing units, state machines, logic circuitries, and/or any devices that manipulate signals based on operational instructions. The processor(s) can be a single processing unit or a number of units, all of which could also include multiple computing units. Among other capabilities, the processor(s) are configured to fetch and execute computer-readable instructions stored in the memory.

The functions realized by the processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

The memory may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory includes modules and data. The modules include routines, programs, objects, components, data structures, etc., which perform particular tasks or implement particular abstract data types. The data, amongst other things, serves as a repository for storing data processed, received, and generated by one or more of the modules.

A person skilled in the art will readily recognize that steps of the methods, presented above, can be performed by programmed computers. Herein, some embodiments are also intended to cover program storage devices, for example, digital data storage media, which are machine or computer readable and encode machine-executable or computer-executable programs of instructions, where said instructions perform some or all of the steps of the described method. The program storage devices may be, for example, digital memories, magnetic storage media, such as a magnetic disks and magnetic tapes, hard drives, or optically readable digital data storage media.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for controlling a hoisting appliance, the method comprising:
   generating a three-dimensional trajectory for the hoisting appliance for navigating through a hoisting area while transporting a load, the trajectory being generated by taking into account a time interval for transporting the load, a dynamic 3-dimensional model of the hoisting area, the model comprising obstacles located within the hoisting area, and three-dimensional information about the load previously obtained from a scanning device mounted on the hoisting appliance when the hoisting appliance was moved for transporting a different load, wherein the trajectory comprises a starting point, a target point and a number of consecutive line segments connecting the starting point and the target point that are included in the hoisting area;
   optimizing the trajectory for allowing a scan by the scanning device of objects located in the hoisting area that are identified as being associated with old log data of a data log during the time interval;
   automatically controlling the hoisting appliance to move in three dimensions along the optimized trajectory while transporting the load, including controlling short travel movement along an X-axis, long travel movement along a Y-axis, and controlling an amount of displacement of the load as suspended along a Z-axis;
controlling the scanning device to scan the identified objects while moving along the optimized trajectory;
receiving scan data output by the scanning device related to the scanned objects; and
updating the data log using the scan data.

2. The method according to claim 1, wherein when the load is transported by the hoisting appliance, the load is transported by the hoisting appliance from the starting point to the target point, and when the hoisting appliance was moved for transporting the different load, the hoisting appliance transported the different load or was moved to pick up the different load in order to transport the different load.

3. The method according to claim 1, wherein the data log is associated with an inventory and further includes physical data and the scan data further includes scanned physical data associated with the scanned objects, and the scan data is further used for updating the physical data with the scanned physical data.

4. The method according to claim 1, wherein the data log is associated with an inventory and further includes physical data associated with objects that were inventoried, wherein the physical data associated with one of the objects that was inventoried includes measured values of position, dimension and temperature of said object and the data log associated with said object includes a timestamp of the measured values.

5. The method according to claim 1, wherein the data log is associated with an inventory and further includes values of temperature associated with objects that were inventoried and optimization of the trajectory further depends on a value of temperature of at least one of the objects that was inventoried and an object in the hoisting area identified as being associated with the at least one of the objects.

6. The method according to claim 1, wherein the generated trajectory is initially based on the shortest or fastest path from all possible paths.

7. The method according to claim 1, wherein the trajectory is optimized by adding and removing line segments.

8. The method according to claim 1, wherein the optimization of the trajectory depends on one or more zones in the hoisting area in which many of the objects in the hoisting area are associated with the old log data.

9. The method according to claim 1, wherein the time interval is determined based on a workload of the hoisting appliance.

10. An apparatus for controlling a hoisting appliance, the apparatus comprising:
one or more network interfaces to communicate with a telecommunication network;
a processor coupled to the network interfaces and configured to execute one or more processes; and
a memory configured to store a process executable by the processor, the process when executed operable to:
generate a trajectory for the hoisting appliance for navigating through a hoisting area while transporting a load, the trajectory being generated by taking into account a time interval for handling the load and dimensions of the load previously obtained from a scanning device mounted on the hoisting appliance when the hoisting appliance was moved for transporting a different load, wherein the trajectory comprises a starting point, a target point and a number of consecutive line segments connecting the starting point and the target point;
optimize the trajectory for allowing a scan by the scanning device of objects located in the hoisting area that are identified as being associated with old log data of a data log during the time interval;
automatically control the hoisting appliance to move along the optimized trajectory while transporting the load, including controlling short travel movement along an X-axis, long travel movement along a Y-axis;
control the scanning device to scan the identified objects while moving along the optimized trajectory;
receive scan data output by the scanning device related to the scanned objects; and
update the data log using the scan data.

11. A non-transitory computer-readable medium having embodied thereon a computer program for executing the method according to claim 1.

12. The method according to claim 1, further comprising:
using the updated data log for optimizing a second trajectory of the hoisting appliance for navigating through the hoisting area by taking into account a second time interval for handling a second load; and
repeating the controlling the hoisting appliance, controlling the scanning device using the second optimized trajectory.

13. The method according to claim 9, further comprising extending the trajectory for scanning additional objects when it is determined that the workload allows time for scanning the additional objects.

14. The method according to claim 1, further comprising:
determining a priority based on contents of the data log; and
optimizing the trajectory in accordance with the priority.

15. The method according to claim 1, further comprising optimizing the trajectory in accordance with a maximum number of objects to be scanned during the time interval.

16. The method according to claim 14, further comprising optimizing the trajectory in accordance with a balance of a maximum number of objects to be scanned during the time interval and the priority.

17. The method according to claim 1, wherein updating the data log includes updating the old log data with new log data.

18. The method according to claim 1, wherein the three dimensional information includes dimensions of the load and/or movement characteristics of the load.

19. The method of claim 2, wherein,
generating the three-dimensional trajectory for the hoisting appliance includes generating a trajectory for navigating through the hoisting area for moving the hoisting appliance to pick up the load, and
automatically controlling the hoisting appliance includes controlling the hoisting appliance to move along the optimized trajectory to pick up the load.

* * * * *